Aug. 5, 1958
L. BODDY
2,846,550
PRESSURE INDICATING DEVICE
Original Filed Aug. 5, 1949
2 Sheets-Sheet 1
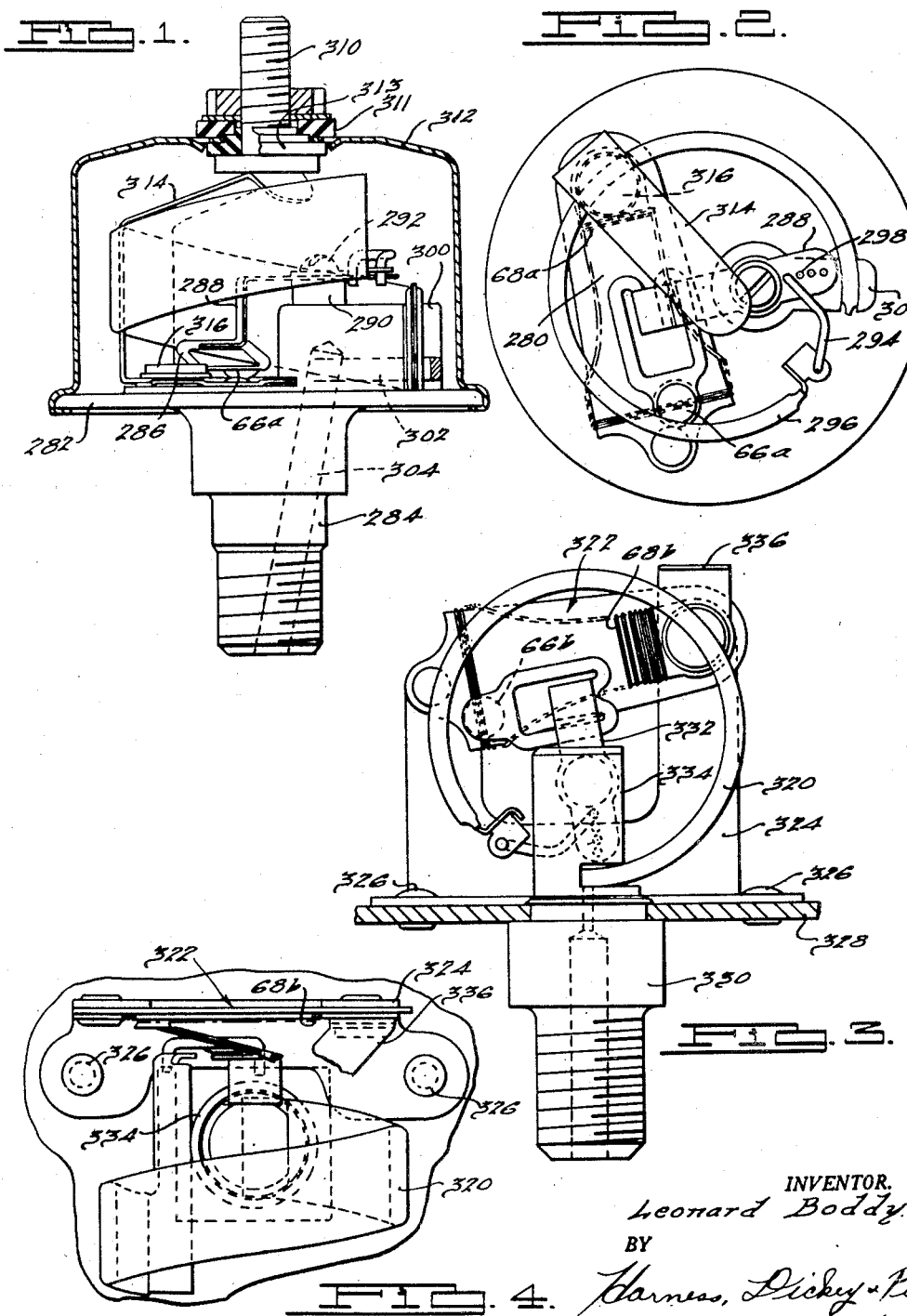
INVENTOR.
Leonard Boddy.
BY
Harness, Dickey & Pierce
ATTORNEYS.

Aug. 5, 1958  L. BODDY  2,846,550
PRESSURE INDICATING DEVICE
Original Filed Aug. 5, 1949  2 Sheets-Sheet 2
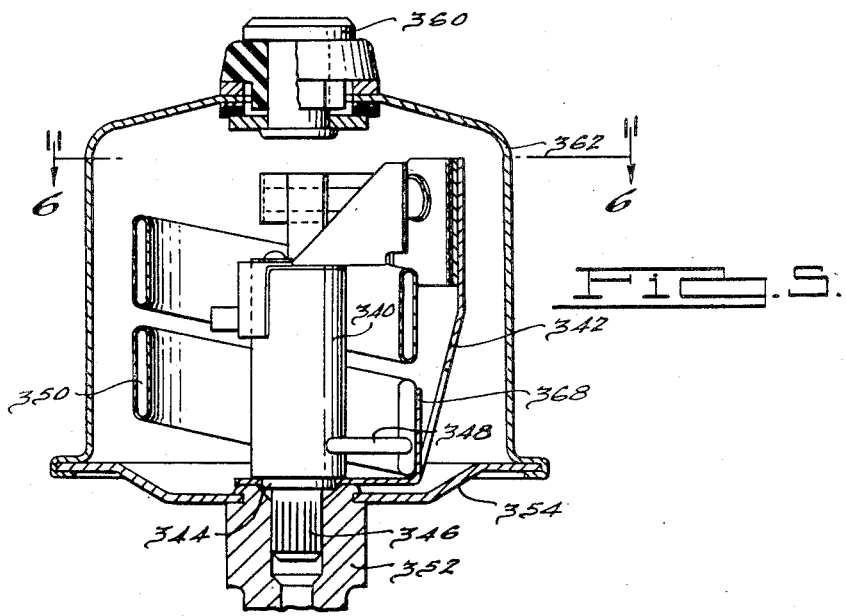
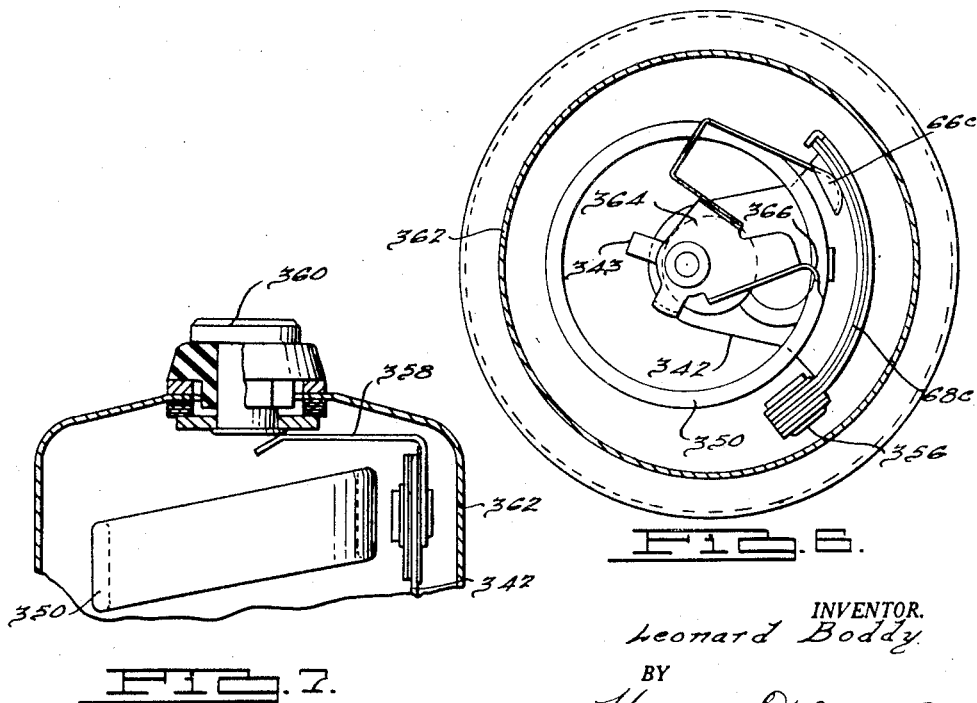
INVENTOR.
Leonard Boddy
BY
Harness, Dickey & Pierce
ATTORNEYS United States Patent Office 2,846,550
Patented Aug. 5, 1958

2,846,550

PRESSURE INDICATING DEVICE

Leonard Boddy, Ann Arbor, Mich., assignor to King-Seeley Corporation, Ann Arbor, Mich., a corporation of Michigan Original application August 5, 1949, Serial No. 108,773. Divided and this application December 20, 1954, Serial No. 476,507

5 Claims. (Cl. 201—48)

This invention relates to current modulating devices and more particularly to variable-impedance pressure measuring devices.

The object of this invention is to improve the accuracy and consistency of performance of pressure-sensitive devices.

A feature of this invention is an improved means for varying the value of a resistance as a function of the positioned variation of a tubular member which moves in response to changes in the pressure of a fluid within the member.

Another feature of this invention is a helical Bourdon tube for varying the value of a resistance as a function of fluid pressures.

The manner of accomplishment of the foregoing object, the nature of the foregoing features, and other objects and features of the invention, may be perceived from the following detailed description of embodiments of the invention when read with reference to the accompanying drawings in which:

Figure 1 is a side elevational view of a pressure-sensing device embodying the principles of the present invention, certain elements being cut away to show details of the construction more clearly;

Fig. 2 is a top plan view of the device shown in Fig. 1, with the cover removed;

Fig. 3 is a side elevational view of a modified form of the device shown in Fig. 1, with certain of the parts being removed and others cut away to improve the presentation;

Fig. 4 is a top elevational view of the device shown in Fig. 3 with certain parts being cut away;

Fig. 5 is a side elevational view, partially in section, of a still further modified form of the device shown in Fig. 1;

Fig. 6 is a sectional view taken substantially along the line 6—6 of Fig. 5; and Fig. 7 is a fragmentary view in vertical section showing further details of the structure of Fig. 5.

This application is a division of my application Serial No. 108,773, filed August 5, 1949, relating to Electrical Control Apparatus. That patent application issued as Patent No. 2,835,885 on May 20, 1958, with certain of the subject matter of that application presented as a continuation application, Serial No. 658,888, filed May 13, 1957.

In general electrical systems are sometimes employed to indicate or gauge fluid pressures, particularly in the gauging of, for example, the oil pressure in an automobile engine. To this end, gauging systems have been devised which include a voltage source, the output of which is preferably reasonably closely regulated, an electrical gauge, and a resistor, the value of which varies as a function of the fluid pressure, for controlling the flow of current through the gauge. The gauge per se may be electromagnetic or electrothermal in nature.

Exemplary types of such gauging systems are disclosed in detail in the above-identified application and reference may be made thereto for a full understanding of an appropriate use for the variable-resistance device herein disclosed.

The pressure sensing devices herein disclosed employ Bourdon tubes as the pressure receiving elements. In each illustrated case, the Bourdon tube is of helical form, which facilitates manufacture. The Bourdon stock is wound in the form of a long helix and sections thereof individual to each unit are simply cut from the complete length.

Referring first to Figs. 1 and 2, the resistor 68a is wound on a flat support 280 which is carried by the enlarged head 282 of the threaded body 284. The moving contact 66a is carried at the end of a springlike member 286, which in turn, is fixed to or formed integrally with an arm 288. Arm 288 is pivotally mounted on a post 290 which rises from the base 282, by means of a screw 292. A short link 294 interconnects arm 288 with one end of the Bourdon tube 296, and may be received in any of a series of mounting holes 298 in the arm 288, in order to provide for adjustment of the range of movement of contact 66a. Bending link 294 affords an adjustment of the zero position of contact 66a.

The other end of the Bourdon tube 296 is fixed to the enlarged base 300, associated with the previously identified post 290. The base 300 and the post 284 are bored as indicated at 302 and 304. Bore 302 directly communicates with the interior of the Bourdon tube 296.

With the foregoing relation, it will be appreciated that changes in fluid pressure introduced through the bore 304, tend to wind or unwind the Bourdon tube 296, and that these movements are communicated to contact 66a through link 294 and arm 288. The element is shown in Fig. 2 in a position corresponding to minimum pressure, in which all of resistor 68a is included in the associated gauge circuit. Increases in pressure thus cause contact 66a to move away from the illustrated end position, towards the other end of resistor 68a.

The terminal stud 310 is initially assembled with but insulated from the outer casing 312. When the latter is applied to the flange 282 of the plug, the enlarged head of the stud 310 is caused to bear against a spring finger 314, which is electrically connected to the resistor 68a by a rivet 316. It will be appreciated that contact 66a is grounded to the base of the unit through post 290. Stud 310 is insulated from the housing 312 by insulators 311 and 313. Insulator 313 nonrotatively receives stud 310 and is nonrotatively connected to the housing 312.

The embodiment shown in Figs. 3 and 4 is much the same as that of Figs. 1 and 2 with the exception that the resistor assembly 322 is mounted on a plate 324 which rises vertically from, and is secured by rivets 326, to a plate 328 which is ring staked to the threaded body 330. The fixed end of tube 320 is anchored to the upper portion of body 330. As before, the movable contact 66b is carried by an arm 332, which is pivotally connected to the post 334, constituted by the reduced upper end portion of the plug body 330. As before, accordingly, contact 66b is grounded through the body 330, and the resistor 68b is electrically connected to a springlike contact finger 336. A housing and stud assembly corresponding to elements 310 and 312 of Fig. 1 is used to complete the assembly, which action brings the finger 336 into electrical contact with the stud corresponding to stud 310.

In the remaining embodiment shown in Figs. 5, 6 and 7, the resistor assembly 68c extends circumferentially of the central post 340, and is supported therefrom by means of an arm 342 which is fitted over a reduced portion 344 thereof. The end section 346 of post 340, which is bored to communicate, through a short tubular section 348, with the interior of the Bourdon tube 350, is press fitted into a counterbore provided at the upper end of the plug body 352. The dished base 354 of the unit is directly secured to the upper end of the plug body 352.

One end of the resistor 68c is electrically connected, by a rivet 356, to a spring finger 358 which, as in the case of Figs. 1 and 2, is adapted to engage the inner end of the insulated terminal stud 360, when the assembly, comprising this stud and the outer casing 362, are put in place. The moving contact 66c is formed at the end of a U-shaped springlike member, which in turn, is carried by an operating arm 364. Arm 364 is pivotally connected to and grounded by the upper end of the post 340 and has a laterally turned portion 366, which is fixed to the free end of the Bourdon tube 350. The fixed end of the Bourdon tube 350 is held in place by a mounting tab 368 struck from the previously identified mounting bracket 342. A limit to the movement of arm 364 is afforded by a pin 343 that is set into the post 340.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A fluid pressure responsive current modulating means comprising a base member adapted for connection to a source of fluid pressure, a tube of the Bourdon type having one end anchored to said base and the other end free to move, said base defining a passage through which fluid under pressure is admitted to said tube, a resistance element supported by said base, a contact engaging said resistance element, an arm pivotally mounted on said base member, said arm having a plurality of apertures therein, means securing said contact to said arm, and means connecting the free end of said tube to said arm, said connecting means comprising a link connected to said tube and engageable with any one of the apertures in said arm.

2. A fluid pressure responsive current modulating means comprising a base member adapted for connection to a source of fluid pressure, a tube of the Bourdon type having one end anchored to said base and the other end free to move, said base defining a passage through which fluid under pressure is admitted to said tube, a resistance element supported by said base, a contact engaging said resistance element, an arm pivotally mounted on said base member, said arm having a plurality of apertures therein, means securing said contact to said arm, and means connecting the free end of said tube to said arm, said connecting means comprising a link connected to said tube and engageable with any one of the apertures in said arm for permitting adjustment of the range of movement of said contact, said link being bendable to control the position of said contact at a preselected position of said tube.

3. A fluid pressure responsive current modulating means comprising a generally cylindrical base member adapted for connection to a source of fluid pressure, a tube of the Bourdon type having one end anchored to said base and the other end free to move, said base defining a passage through which fluid under pressure is admitted to said tube, variable resistance means carried by said base and having relatively fixed and movable parts, the movable part of said resistance means being operatively responsive to movement of the free end of said tube, said tube being helical in form, the axis of the helix being parallel to the axis of said generally cylindrical base member.

4. A fluid pressure responsive current modulating means comprising a generally cylindrical base member adapted for connection to a source of fluid pressure, a tube of the Bourdon type having one end anchored to said base and the other end free to move, said base defining a passage through which fluid under pressure is admitted to said tube, variable resistance means carried by said base and having relatively fixed and movable parts, the movable part of said resistance means being operatively responsive to movement of the free end of said tube, said tube being helical in form, the axis of the helix being perpendicular to the axis of said generally cylindrical base member.

5. A fluid pressure responsive current modulating means comprising a base member adapted for connection to a source of fluid pressure, a tube of the Bourdon type having one end anchored to said base and the other end free to move, said base defining a passage through which fluid under pressure is admitted to said tube, variable resistance means carried by said base and having relatively fixed and movable parts, the movable part of said resistance means being operatively responsive to movement of the free end of said tube, a cover removably secured to said base and enclosing said Bourdon tube and variable resistance means, and a terminal carried by but insulated from said cover and disposed when said cover is in place to electrically engage the fixed part of said variable resistance means.

References Cited in the file of this patent

UNITED STATES PATENTS 2,622,177    Klose                  Dec. 16, 1952

FOREIGN PATENTS 483,450    Great Britain         Apr. 20, 1938